(12) United States Patent
Risen, Jr.

(10) Patent No.: US 6,652,203 B1
(45) Date of Patent: Nov. 25, 2003

(54) PRECISION DRILL BITS

(75) Inventor: Carl W. Risen, Jr., Louisville, KY (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 10/232,036

(22) Filed: Aug. 30, 2002

(51) Int. Cl.[7] ................................................ B23B 51/02
(52) U.S. Cl. ...................................... 408/225; 408/230
(58) Field of Search ................................ 408/224, 229, 408/225, 230, 211

(56) References Cited

U.S. PATENT DOCUMENTS

| | | | |
|---|---|---|---|
| 6,221 A | 3/1849 | Sanford | |
| 238,002 A | 2/1881 | Ransom | |
| 1,387,994 A | 8/1921 | Lewis | |
| 2,294,969 A | * 9/1942 | Engvall et al. | 408/224 |
| 3,706,504 A | 12/1972 | Simonffy | |
| 4,400,119 A | * 8/1983 | Clement | 408/230 |
| 4,605,347 A | 8/1986 | Jodock et al. | |
| 4,968,193 A | 11/1990 | Chaconas et al. | |
| 5,282,705 A | 2/1994 | Shiga et al. | |
| 5,288,183 A | 2/1994 | Chaconas et al. | |
| 5,350,261 A | * 9/1994 | Takaya et al. | 408/229 |
| 5,478,176 A | 12/1995 | Stedt et al. | |
| 5,570,978 A | * 11/1996 | Rees et al. | 408/144 |
| 5,800,101 A | 9/1998 | Jindai et al. | |
| 5,807,039 A | 9/1998 | Booher et al. | |
| 6,402,448 B1 | * 6/2002 | Dicke | 411/387.5 |

OTHER PUBLICATIONS

Marks' Standard Handbook for Mechanical Engineers, Tenth Edition pp. 13–55 and 13–56.*

* cited by examiner

*Primary Examiner*—Daniel W. Howell
(74) *Attorney, Agent, or Firm*—Maginot, Moore & Beck

(57) ABSTRACT

A precision drill bit comprises an elongated body having a stepped centering tip at one end and an engagement shank at the opposite end. A first portion of the bit adjacent the tip has an outer diameter that is less than the outer diameter of a second portion of the bit. At least one cutting flute extends along the length of the bit and exhibits a helix angle of about 38° at the tip. The helix angle decreases to an angle of about 15° at the end of the flute run-out. The helix angle changes progressively and substantially linearly over a number of segments along the length of the drill bit.

32 Claims, 1 Drawing Sheet

PRECISION DRILL BITS

BACKGROUND OF THE INVENTION

The present invention relates to drill bits, such as bits for use in high-speed machining and/or with portable hand held drills.

A wide variety of twist drills have been developed over the years for utilization in various machining operations. The typical twist drill is characterized by a drill bit having one or more spiral groves formed in the shank of the bit. These grooves, or "flutes", are useful to force lubricant to the surface being machined, which is particularly beneficial for metal machining. In addition, the flutes provide a means for moving chips from the path of the drilling operation.

One important object in the design of the drill bits is to eliminate the bunching of chips within the newly drilled hole. In many drilling operations, the bulk of the heat generated in the operation is contained within the chips. If the chips are removed, the heat generated at the point of machining is dissipated and the drill bit and part being machined stay relatively cool. On the other hand, if the chips bunch within the drilled hole, the frictional heat tends to build up, which can be damaging to the machined part, can decrease the life of the drill bit, and can even make the drilling operation more difficult.

Efficient chip removal also reduces the thrust force required to advance the drill bit through the machined material. Where the chips bunch within the drilled hole, a greater thrust force is required to continually push the bit through the material. When the drill bit finally breaks through the back side of the material, the break-through thrust tends to pull the drill bit into the workpiece, which can damage the workpiece, as well as the drill and bit itself.

It is known that for optimum chip ejection, the shorter the path that the chip must travel, the more efficient the ejection and the greater ability to prevent chip compaction. Thus, some drill bits provide spherical flutes having a lower angle helix(when measured relative to the longitudinal axis of the bit) to facilitate the chip removal. However, the lower angle helix has the disadvantage of having a lower penetration rate and lower energy efficacy in completing the drilling operation. Thus, at the other end of the scale, a higher angle helix cuts and penetrates the material much more quickly and efficiently at a given rotational speed for the drill bit.

Another important aspect of the typical rotary drill bit is the ability to maintain the bit at a desired location. A common phenomenon with a standard drill bit is that the bit will "skate" across the surface to be machined. Consequently, there is a need for a "self centering" feature on the drill bit that allows the drill bit to be centered at the desired location more quickly and efficiently. The ability to rapidly center the drill bit is very beneficial where a number of drilling operations are to be performed in a particular workpiece.

SUMMARY OF THE INVENTION

The present invention seeks to combine the chip removal and self-centering features in a single drill bit. Thus, in one embodiment of the invention, a drill bit is provided that comprises an elongated body having a tip at one end and an engagement shank at the opposite end. A first portion of the body adjacent the tip has a first diameter and a second portion between the first portion and the engagement shank has a second diameter that is greater than the first diameter. In other words, the bit includes a reduced diameter tip that improves the centering capability of the bit.

In certain embodiments, the reduced diameter tip can have a diameter about ⅔ of the second diameter. The body can define a step between the first portion and the second portion, with the step in certain embodiments defining an included angle of less than 180° relative to the longitudinal axis of the elongated body. In specific embodiments, the included angle is about 135°. The stepped diameter tip not only provides a self-centering capability, it also improves the starting proficiency for a newly drilled hole in a workpiece.

In a further feature of the inventive drill bit, the elongated body defines flutes on at least the second portion. Most preferably, the flutes continue across the first portion to the tip of the bit. In an important aspect of the invention, the flutes are formed at a helix angle relative to the longitudinal axis of the elongated body, where the helix angle decreases from the tip to the engagement shank. The flutes of the second portion can follow the second diameter, which can be substantially constant along the length of the second portion. The flutes can combine with the stepped diameter tip for improved drilling efficiency.

In a preferred embodiment, the helix angle starts at about 38° adjacent the tip and decreases to a helix angle at the engagement shank of about 15°. In accordance with a feature of the invention, the helix angle can decrease in three segments along the length of the bit. This in a first segment, the helix angle decreases from about 38° adjacent the tip to about 35° at a first distance from the tip. This first distance can be about 0.5 inches for a typical ⅜ inch bit.

In a second segment, the helix angle can decrease from about 35° at the first distance to about 17° at a second distance from the tip. This second distance can be about 2.0 inches. In the final segment, the helix angle decreases from about 17° at the second distance to about 15° at a third distance from the tip. In a preferred embodiment, the third distance can be at least 3.5 inches.

Preferably, the helix angle decreases substantially linearly over each of the three segments. The slope of the linear change can vary between segments. For instance, the slope of the helix angle change in the second segment (i.e., between the first and second distances) can be much steeper than the slope of the angle change in the other segments. The slope of the change in the second segment is preferably steep enough to provide for rapid chip removal, but not so steep as to increase the risk of chip bunching along the length of the bit. Likewise, the slope in the initial segment is preferably shallow enough to provide smooth movement of the chip away from the drilling site. Preferably, the difference in slopes between the first and second segments is not dramatic enough to risk chip bunching at the first distance.

One benefit of the present invention is that it combines a self-centering feature with a variable helix bit. Another benefit is that the variable helix is calibrated to mutually optimize penetration rate and chip removal. Other benefits and objects of the invention will become apparent upon consideration of the following written description taken with the accompanying figures.

DESCRIPTION OF THE PREFERRED EMBODIMENTS

Figure 1:
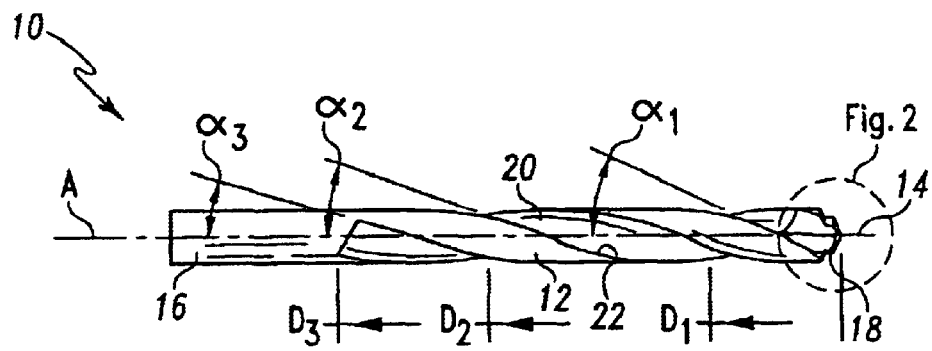
FIG. 1 is a side elevational view of a precision drill bit in accordance with one embodiment of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

A precision drill bit 10 includes an elongated body 12 defining an axis A. The body defines a penetrating tip 14 at one end and an engagement shank 16 at the opposite end. The engagement shank can be configured to be engaged by a conventional mounting chuck. In accordance with the typical twist drill designed, the drill bit 10 includes a number of spiral flutes 22 extending along a portion of the length of the body 12. In the illustrated embodiments, a single flute is depicted; however, it is understood that multiple flutes may be provided.

In accordance with one aspect of the invention, the body 12 of the drill bit 10 includes a first portion 18 at the tip 14 of the bit, and a second portion 20 disposed between the engagement shank 16 and the first portion 18. Shown in more detail in the enlarged view of FIG. 2, the first portion 18 has a reduced diameter of $\Phi_1$ relative to the diameter $\Phi_2$ of the second portion 20. Thus, the first portion 18 is defined by a step 24 from the second portion 20, and a land 26 extending a distance h from the step 24.

Figure 2:
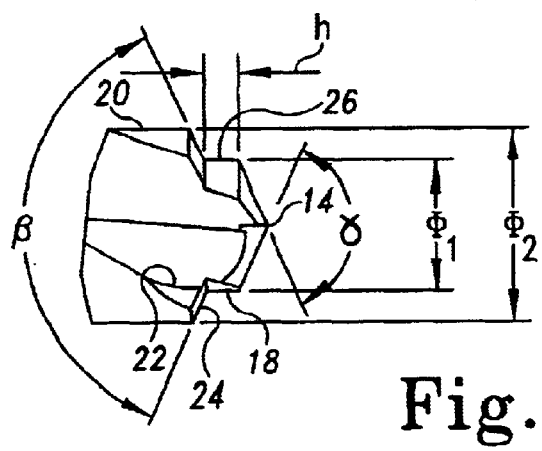
FIG. 2 is an enlarged side view of the end of the drill bit contained within the circle designated 2 in FIG. 1.

As shown in FIG. 2, the first portion 18 tapers to the pointed penetration tip 14 at an included angle γ. In a most preferred embodiment this angle γ is about 135°. It has been found that a tip 14 tapered at this dimension optimizes the centering capability of the tip with the ability to easily penetrate a workpiece during a drilling operation. In addition, it has been found that a first diameter $\Phi_1$ that is about ⅔ of the larger second diameter $\Phi_2$ also helps the drill bit 10 to penetrate the workpiece more quickly and easily at the start of the hole. In some respects, the first portion 18 operates as a smaller pilot drill bit for enlargement by the second portion of the bit.

Also shown in FIG. 2, the step portion 24 defines an included angle β relative to the longitudinal axis A of the body 12. It has been found that a step angle β that is less than 180° also increases the penetration rate for the drill bits over prior conventional helical drill bits. It has further been discovered that an optimum value for the step angle β is about 135°. Since the first portion 18 serves to pilot and center the drill bit 10 during use, it preferable that the height h of the first portion 18 be as small as possible, yet still long enough to provide a centering engagement of the workpiece. In a specific embodiment, the height h of the first portion 18 is about 0.062 inches.

In another important aspect of the invention, a variable helix angle is combined with the reduced diameter centering tip described above. Thus, in accordance with this feature of the invention, the helix angle α decreases from the tip 14 to the engagement shank 16. Most preferably, the flutes 22 commence at the tip 14 and extend along both the first portion 18 and the second portion 20. However, it can be appreciated that in certain applications the cutting flute 22 may commence with the second portion 20 only. At any rate, the variable helix feature of the present invention combines the high helix angle at the tip of the bit to provide for rapid and efficient penetration of the workpiece, with a lower helix angle along the length of the bit to provide a shorter path for chip ejection. These features combine to allow the drill bit 10 to progress more quickly through the workpiece while generating less heat build up and requiring less breakthrough thrust to penetrate the workpiece.

In accordance with one feature of the invention, the helix angle α of the flute 22 changes in discrete segments along the length of the bit. In the preferred embodiment, the helix changes over three such segments. In a first segment beginning at the tip 14 and extending a distance $D_1$ from the tip, the helix angle has a value $\alpha_1$. In a second segment extending beyond the first distance $D_1$ to its second distance $D_2$, the helix angle has a value $\alpha_2$. In the final segment terminating at the distance $D_3$ with the end of the flutes 22, the helix angle has a value of $\alpha_3$. In accordance one feature of the present invention, each of the helix angles can adhere to the following relationship $\alpha_2 > \alpha_1 > \alpha_3$.

In accordance with the preferred embodiment, the flutes 22 start at a helix angle $\alpha_1$ of about 38°. This helix angle decreases over the distance $D_1$ to a helix angle $\alpha_2$ of 35°. The length of the body 12 of the drill bit 10 between the distance $D_1$ and $D_2$ can be referred to as an intermediate transition zone. In this zone, the helix angle decreases from 35° to 17°. In the final length of the drill bit between distance $D_2$ and $D_3$, which can be referred to as the flute run-out zone, the helix angle decreases further from 17° to 15°. It has been found this controlled variation or decrease in helix angle optimizes penetration speed with chip removal features of the drill bit.

In a most preferred embodiment, the distance $D_1$ over which the helix angle transitions from about 38° to about 35°, is about 0.5 inches. The second distance $D_2$, as measured from the tip 14, is about 2.0 inches. The third distance $D_3$ depends upon the length of the flutes 22. Nominally, this distance is at least 3.5 inches from the tip 14, and can be preferably 3.67 inches.

Figure 3:
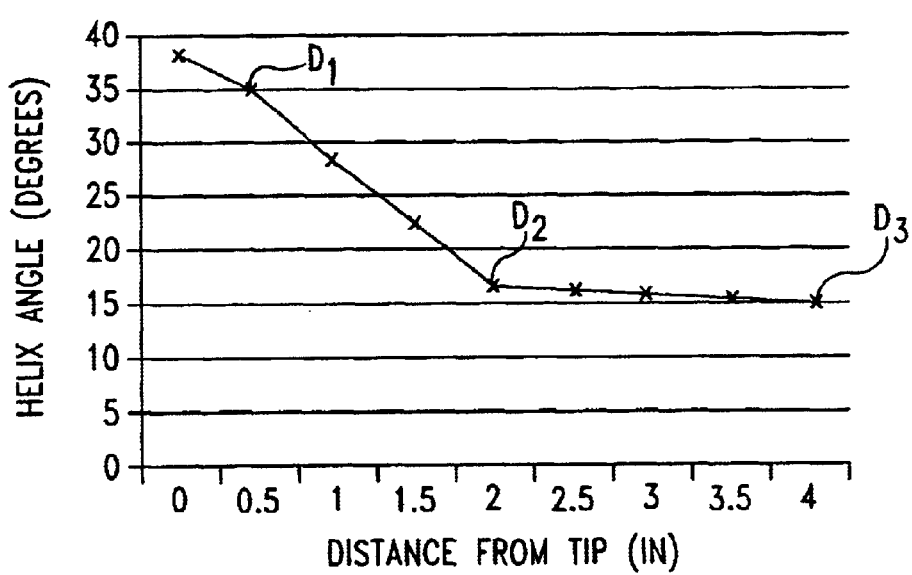
FIG. 3 is a graph of helix angle versus distance for the drill bit of FIGS. 1 and 2 in accordance with one embodiment of the present invention.

The change in helix angle is reflected in the graph in FIG. 3. In this graph it can be seen that the helix angle decreases from an initial value of about 38° to value of 35° at a distance $D_1$, from 35° to 17° from $D_1$ to $D_2$, and 17° to 15° from distance $D_2$ to $D_3$. Preferably, the change in helix angle in each segment is linear, meaning that over the length of the bit between the tip and distance $D_1$ the helix angle changes substantially linearly from 38° to 35°, and likewise over the remaining distance segments.

In accordance with one aspect of the invention, the change in helix angle from the tip 14 to the distance $D_1$ is at a first slope, the angle change from distance $D_1$ to distance $D_2$ is at a second slope, and over the final segment from distance $D_2$ to $D_3$ at a third slope. Preferably, each of the slopes is different, and most preferably, the second slope over the intermediate segment is greater than the other two slopes. It is in this region that the bulk of the chip transfer from the drilling site occurs. The first slope is less than the second slope so that the change in helix angle is more gradual from the tip 14 than over the intermediate segment of the bit length. A more gradual change in helix angle is preferable so that the bit has the opportunity to establish a bite into the workpiece before the chip is conveyed up the bit. A more severe slope can compromise the initial cutting action of the flute and risk bunching of the newly formed chip immediately at the drilling site.

On the other hand, the slope of the last segment is much shallower than the slope in either of the prior two segments. Thus, in the last segment from distance $D_2$ to $D_3$ the helix angle changes gradually so that the continuously generated chips can continue generally unbroken along the remaining length of the bit, even as the drill bit penetrates further into the workpiece.

In a specific embodiment, the slope in the first segment can be about 6° per inch, the second segment about 12°/inch and the last segment about 1° every inch. Preferably, the second segment slope is approximately double the helix angle change rate at the tip of the bit, and is significantly greater, about ten times or more, than the last slope.

The illustrated embodiments shown in FIGS. 1 and 2 correspond to a representative 3/8 inch drill bit. It is understood that certain of the specific dimensions would be scaled up or down depending upon the size of the particular drill bit. However, it can also be appreciated that the relationships between dimensions can remain unchanged, regardless of the size of the bit. Preferably, the change of flute helix angle from about 38° to 15° would adhere regardless of the cutting diameter of the drill bit. Moreover, the distance $D_1$–$D_3$ at which the helix values change would build on the same each other. For instance, in the illustrated embodiment, the ratio of the distance $D_1$ to the total length of the flute 22—i.e. distance $D_3$—is about 0.14. Similarly, the ratio of distance $D_2$ to the flute length distance $D_3$ is about 0.55. In a preferred application of the invention, if the drill bit is lengthened, and the flute length correspondingly increased, the distances $D_1$ and $D_2$ would maintain the same dimensional relationship to the flute length distance $D_3$.

A precision drill bit configured with in accordance with the present invention has been found to provide significant advantages over currently known helical bits. For instance, the combination of the variable helix with the steeped point configuration has led to an increased penetration rate of the precision drill bit over conventional bits. In one comparison, a standard split point bit having a 30° helix penetrated a particular test piece at a rate of 0.493 inches per minute. A known bit having a 38° helix penetrated at a rate of 0.589 inches per minute. However, a drill bit constructed in accordance with the present invention exhibited a penetration rate of 0.623 inches per minute. This increase in penetration rate represents a significant improvement in time savings in performing a number of drilling operations, as well as increases in drill bit life.

In these same test, it was found that the drill bit in accordance with the present invention was more prone to generate continues chips that can be readily and easily removed as the chip advances up the variable helix flute. In contrast, the prior drill bits intended to generate small flake-like chips which remain in the drill hole and lead to increased heat build up and increase thrust force requirements. All of these improvements are more significant when the drill is a portable hand-held drill, since most of these improvements help reduce the amount of time needed to drill through a workpiece. This reduced drilling time increases the number of drilling operations that can be preformed before the portable drill must be recharged.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A drill bit comprising:
   an elongated body having a tip at one end and an engagement shank at the opposite end, a first portion of said body adjacent said tip having a first diameter and a second portion between said first portion and said engagement shank having a second diameter greater than said first diameter;
   said elongated body defining at least one flute in at least said second portion, said flute formed at a helix angle relative to the longitudinal axis of said elongated body, the helix angle decreasing from said tip to said engagement shank,
   wherein the helix angle starts at about 38° adjacent said tip and the helix angle at said engagement shank is about 15°,
   wherein the helix angle decreases from about 38° adjacent said tip to about 35° at a first distance from said tip,
   wherein the helix angle decreases from about 35° at said first distance to about 17° at a second distance from said tip,
   wherein the helix angle decreases from about 17° at said second distance to about 15° at a third distance from said tip,
   wherein said third distance is at least 3.5 inches,
   wherein the helix angle decreases substantially linearly over said third distance,
   wherein the helix angle decreases substantially linearly over said first distance at a first slope, the helix angle decreases substantially linearly over said second distance at a second slope that is greater than said first slope, and the helix angle decreases substantially linearly over said third distance at a third slope that is less than said second slope.

2. The drill bit of claim 1, wherein said third slope is less than said first slope.

3. A drill bit comprising:
   an elongated body having a tip at one end and an engagement shank at the opposite end, said elongated body defining at least one flute, said flute formed at a helix angle relative to the longitudinal axis of said elongated body, the helix angle decreasing substantially linearly at a first slope over a first distance from said tip, substantially linearly at a second slope over a second distance from said tip greater than said first distance, and substantially linearly at a third slope over a third distance from said tip greater than said second distance.

4. The drill bit of claim 3, wherein said first, second and third slopes are different from each other.

5. The drill bit of claim 3, wherein said second slope is greater than said first slope.

6. The drill bit of claim 5, wherein said second slope is about twice said first slope.

7. The drill bit of claim 5, wherein said second slope is greater than said third slope.

8. The drill bit of claim 7, wherein said second slope is at least ten times greater than said third slope.

9. The drill bit of claim 7, wherein said first slope is greater than said third slope.

10. The drill bit of claim 9, wherein said first slope is about six times greater than said third slope.

11. A drill bit comprising an elongated body having a tip at one end and an engagement shank at the opposite end,
   wherein said elongated body defines at least one flute, said flute being formed at a helix angle relative to a longitudinal axis of said elongated body, and
   wherein the helix angle decreases (i) substantially linearly over a first segment of said elongate body at a first slope, (ii) substantially linearly over a second segment of said elongate body at a second slope that is greater than said first slope, and (iii) substantially linearly over a third segment of said elongate body at a third slope that is less than said second slope.

12. The drill bit of claim 11, wherein said first slope, said second slope, and said third slope are different from each other.

13. The drill bit of claim 11, wherein said second slope is greater than said first slope.

14. The drill bit of claim 13, wherein said second slope is about twice said first slope.

15. The drill bit of claim 13, wherein said second slope is greater than said third slope.

16. The drill bit of claim 15, wherein said second slope is at least ten times greater than said third slope.

17. The drill bit of claim 15, wherein said first slope is greater than said third slope.

18. The drill bit of claim 17, wherein said first slope is about six times greater than said third slope.

19. The drill bit of claim 11, wherein:
a first portion of said body adjacent said tip has a first diameter,
a second portion between said first portion and said engagement shank has a second diameter,
said second diameter is greater than said first diameter.

20. The drill bit of claim 19, wherein said first diameter is about ⅔ of said second diameter.

21. The drill bit of claim 19, wherein said body defines a step between said first portion and said second portion.

22. The drill bit of claim 21, wherein said first portion defines a cylindrical land extending from said step and terminating in a tapered point.

23. The drill bit of claim 22, wherein said land has a height of about 0.062 inches from said step.

24. The drill bit of claim 21, wherein said step defines an included angle of less than 180° relative to the longitudinal axis of the elongated body.

25. The drill bit of claim 24, wherein said included angle is about 135°.

26. The drill bit of claim 19, wherein said second diameter is substantially constant along the length of said second portion.

27. The drill bit of claim 11, wherein the helix angle is about:
38° adjacent said tip, and
15° adjacent said engagement shank.

28. The drill bit of claim 11, wherein the helix angle decreases from about 38° at one end of said first segment to about 35° at another end of said first segment.

29. The drill bit of claim 11, wherein the helix angle decreases from about 35° at one end of said second segment to about 17° at another end of said second segment.

30. The drill bit of claim 11, wherein the helix angle decreases from about 17° at one end of said third segment to about 15° at another end of said third segment.

31. A drill bit comprising an elongated body having a tip at one end and an engagement shank at the opposite end,
wherein said elongated body defines at least one flute, said flute being formed at a helix angle relative to a longitudinal axis of said elongated body,
wherein the helix angle decreases (i) substantially linearly over a first segment of said elongate body at a first slope, (ii) substantially linearly over a second segment of said elongate body at a second slope that is greater than said first slope, and (iii) substantially linearly over a third segment of said elongate body at a third slope that is less than said second slope,
wherein the helix angle decreases from about 38° at one end of said first segment to about 35° at another end of said first segment,
wherein the helix angle decreases from about 35° at one end of said second segment to about 17° at another end of said second segment, and
wherein the helix angle decreases from about 17° at one end of said third segment to about 15° at another end of said third segment.

32. The drill bit of claim 31, wherein:
said first segment extends about 0.5 inches in length,
said second segment extends about 1.5 inches in length, and
said third segment extends about 2.0 inches in length.

* * * * *